United States Patent Office 3,426,889
Patented Feb. 11, 1969

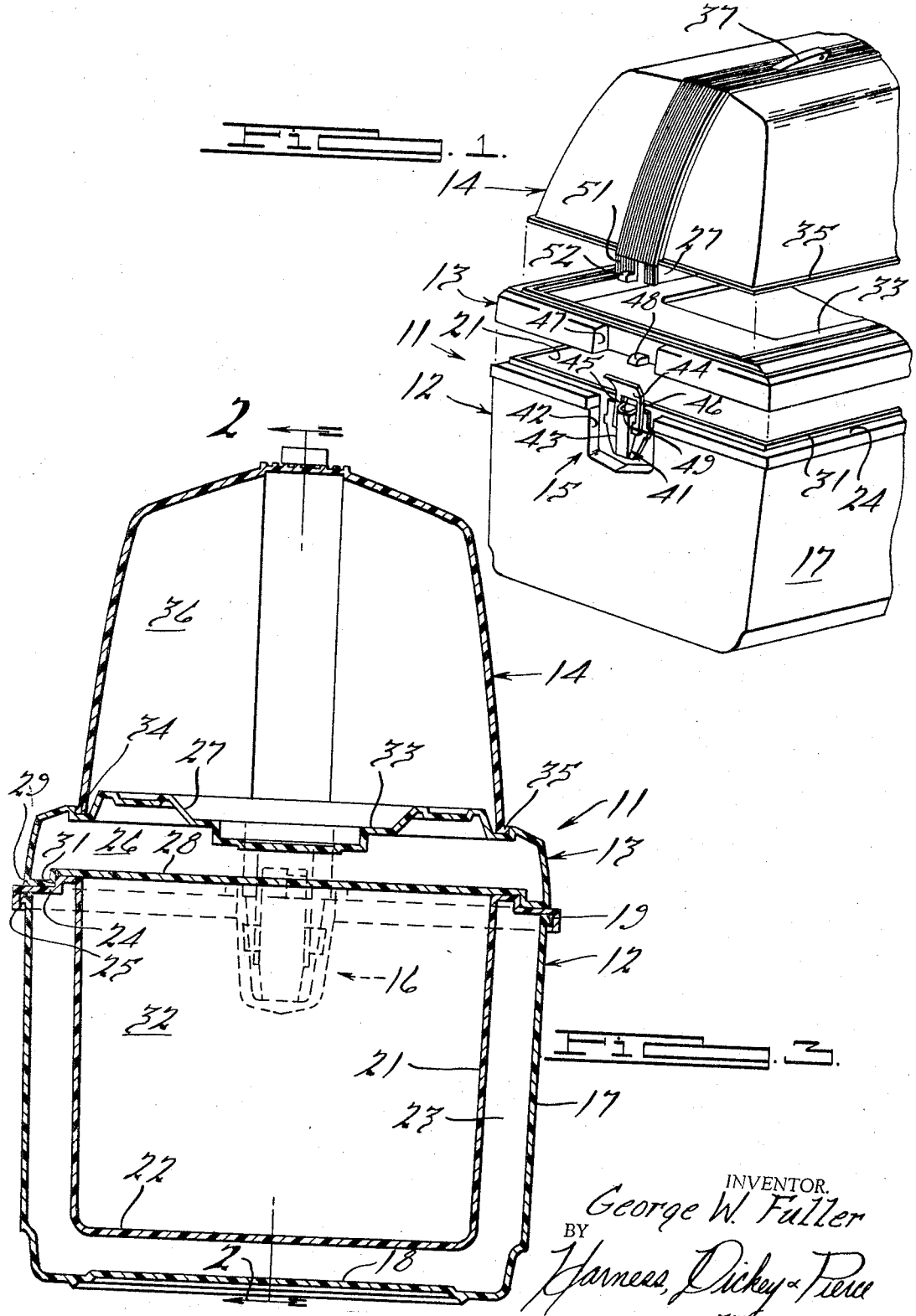

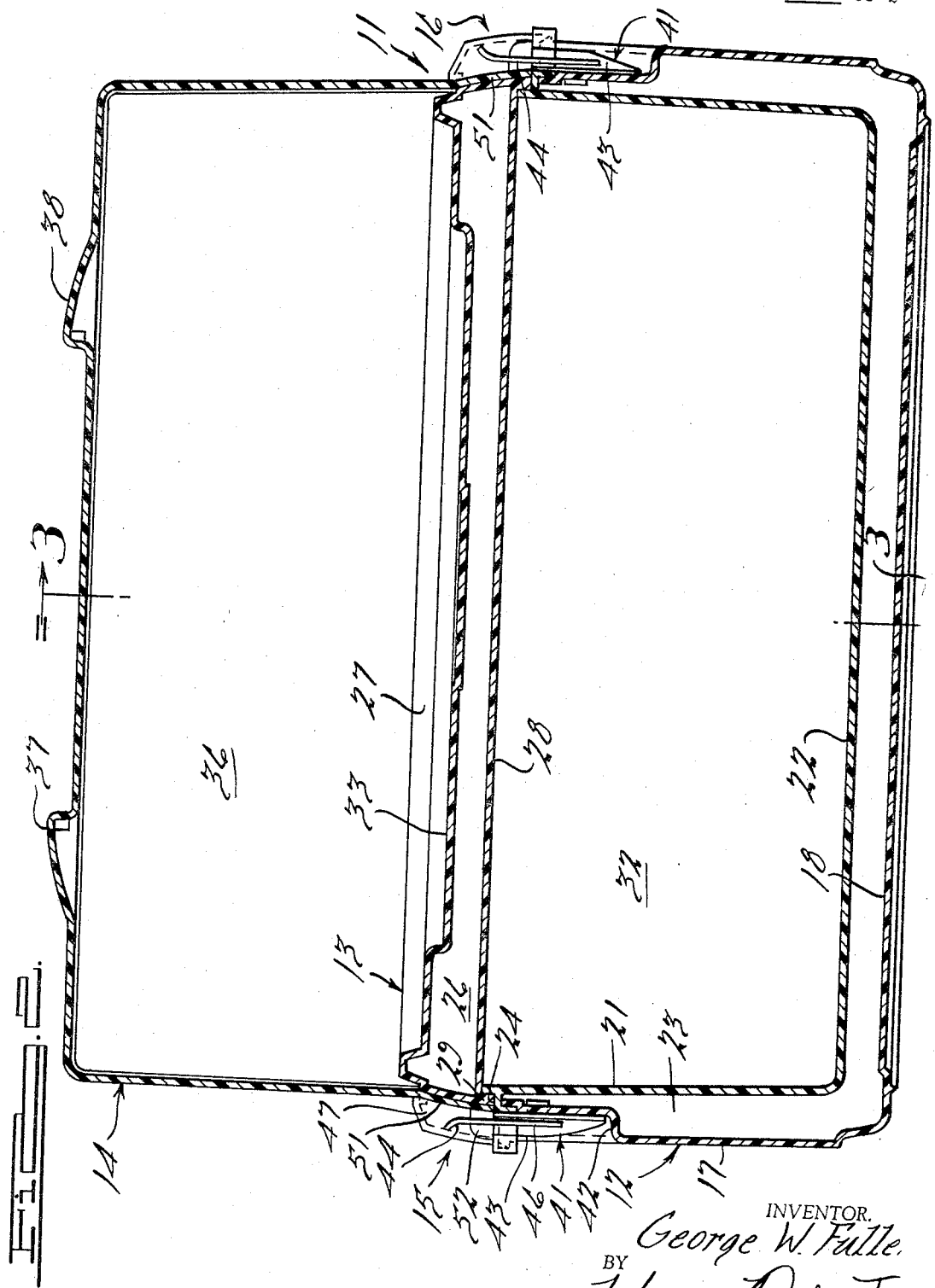

3,426,889
INSULATED LUNCH KIT
George W. Fuller, Hampton, Conn., assignor to King-Seeley Thermos Co., a corporation of Michigan
Filed Aug. 2, 1967, Ser. No. 657,960
U.S. Cl. 206—4
Int. Cl. A45c 11/00; B65d 51/18
8 Claims

ABSTRACT OF THE DISCLOSURE

An insulated lunch kit comprised of a body member that defines an open food receiving cavity, a cover member that is supported upon the body member and forms a closure for the food receiving cavity, a bottle cover that defines a cavity for receiving an insulated bottle and which is supported on and closed by the cover member and a latching assembly for holding the aforenoted parts together. The latching assembly consists of a latch member carried by the body member and which coacts with fixed latch members carried by the cover member and bottle cover.

Background of the invention

This invention relates to an insulated lunch kit and more particularly to an improved latch structure for such a lunch kit.

One type of insulated lunch kit is made up of members that define a first cavity that is adapted to receive food and a second cavity in which an insulated bottle or the like is adapted to be positioned. In one form of such a lunch kit, the food receiving cavity is formed by a body member and a cover member which forms a closure for the body member. The bottle cavity is formed by a bottle cover with the cover member also forming a closure for the bottle cover. Of course, some form of latching mechanism should be provided for holding the parts in their assembled relationship. Such a latch preferably should be relatively simple in construction, low in cost and should permit certain of the components to be used independently of each other. In order to simplify the overall arrangement, it has been proposed to employ a latching mechanism that holds the bottle cover directly to the body member and to employ this latched relationship to further hold the cover member with relation to the other two members. Although such a construction has certain advantages, it dictates that the bottle cover must always be used regardless of whether an insulated bottle is, in fact, used with the kit.

It is, therefore, a principal object of this invention to provide an improved lunch kit having food and bottle receiving cavities.

It is another object of this invention to provide an improved latching mechanism for a lunch kit of the aforesaid type.

It is a further object of this invention to provide a lunch kit comprised of a body member, cover member, bottle cover and latching mechanism wherein the latching mechanism will hold the cover member to the body member without necessitating use of the bottle cover.

Summary of the invention

A lunch kit of the like embodying this invention is comprised of a body member, a cover member, a bottle cover and a latching mechanism for securing the components together. The body member defines a food receiving cavity opening through the upper end of the body member with the cover member forming a closure for the open end of the cavity. The bottle cover defines a cavity that opens through its lower face and is adapted to be supported adjacent the cover member with the cover member forming a closure for the bottle cover cavity. The latching means is comprised of a first latching member carried by the body member, a second latching member carried by the cover member and a third latching member carried by the bottle cover. The first and second latching members coact to fix the cover member to the body member and the first and third latching members coact to secure the bottle cover in assembled relationship to the body member and in a supported relationship upon the cover member.

Brief description of the drawings

FIGURE 1 is an exploded perspective view of a portion of a lunch kit embodying this invention showing one end of the lunch kit.

FIGURE 2 is a longitudinal cross-sectional view of the lunch kit taken along the line 2—2 of FIGURE 3.

FIGURE 3 is a transverse cross-sectional view of the lunch kit taken along the line 3—3 of FIGURE 2.

Detailed description of the preferred embodiment

A lunch kit embodying this invention, identified generally by the reference numeral 11, is comprised of a body member assembly 12, a cover member assembly 13, a bottle cover 14 and a pair of latching assemblies 15 and 16.

The body member assembly 12 is comprised of an outer shell 17 of generally rectangular configuration closed at its bottom end by an integral bottom wall 18 and open at its upper end. An outwardly extending flange 19 is formed at the upper end of the outer shell 17. A generally rectangular inner shell 21 depends into the outer shell 17 and is closed at its bottom end by an integral bottom wall 22. The bottom wall 22 is spaced from the outer shell bottom wall 18 and the inner shell 21 is spaced inwardly from the outer shell 17 to define an insulating gap 23 between the inner and outer shells. The inner shell 21 has an outwardly extending flange 24 formed substantially around its periphery that terminates in an inturned or re-entrant lip portion 25 that engages the outer shell flange 19 for fixing these shells together. If desired, some form of adhesive may also be employed for securing the inner and outer shells to each other.

The cover member 13 may be blow molded or otherwise suitably formed from a plastic or other material and defines an insulating cavity 26 between an upper wall 27 and a lower wall 28. The outer end of the lower wall 28 is formed with a downwardly extending flange or tongue 29 that is adapted to be supportingly engaged within a recess 31 formed around the periphery of the flange 24 of the body member 12 whereby the cover member 13 forms a closure for a cavity 32 formed by the body member assembly 12. The cavity 32 is adapted to receive food or other similar articles such as are normally carried in such lunch kits.

The upper wall 27 of the cover member 13 is suitably shaped to form a longitudinally extending trough, indicated generally by the reference numeral 33, to supportingly engage an insulated bottle or the like (not shown). Adjacent the outer periphery of the trough 33 the upper wall 27 is formed with a depressed groove 34 that is adapted to supportingly receive a flange 35 formed at the lower end of the bottle cover 14. The bottle cover 14 is generally rectangular in shape and defines a longitudinally extending cavity 36 to contain the insulated bottle. The upper end of the cover member 14 is provided with longitudinally spaced embossments 37 and 38 to facilitate attachment of a carrying handle (not shown) for the lunch kit 11.

All of the parts thus far described may be formed from a plastic having a low coefficient of thermal conductivity, sheet metal or any other suitable material commonly used for lunch kits.

Each of the latching mechanisms 15 and 16 is substantially the same and for this reason only the mechanism 15 will be described in detail. Components of the latching mechanism 16 which are identical to those described in connection with the mechanism 15 have been identified by the same reference numerals. The latching mechanism 15 comprises a first latching member, indicated generally by the reference numeral 41, that is received and supported in an embossed recess 42 formed in the outer shell 17 of the body member assembly 12. The first latching member 41 is comprised of a base part 43 that is rigidly affixed to the body member assembly 12. A generally U-shaped latching member 44 has a pair of depending arms 45 and 46 which have inwardly extending tangs (not shown) formed at their lower end, which tangs are pivotally supported within the base member 43. Hence, the U-shaped latching member 44 may be pivoted between a latched and an unlatched position about these tangs. If desired, a spring mechanism (not shown) may be incorporated for urging the latching member 44 into its engaged position.

The end of the cover member 13 adjacent the body member embossment 42 is formed with a complementary embossment 47 from which an integral latching finger 48 extends. The latching finger 48 is adapted to be received within a latching recess 49 formed by the latching member 44 when the latching member 44 is in its latched position and when the cover member 13 is supported upon the body member assembly 12. The upper end of the latching finger 48 engages the portion of the latching member 44 that defines the upper end of the recess 49 and the finger 48 extends approximately half way across the width of the recess 49.

The bottle cover 14 is formed with a downwardly extending portion 51 that extends across the cover member embossment 47 and at least partially into the body member embossment 42. The lower end of the downwardly extending portion 51 is formed with an integral outwardly extending latching finger 52 that is substantially the same shape as the latching finger 48 of the cover member 13. When the bottle cover 14 is supported upon the cover member 13, the latching finger 52 is adjacent the latching finger 48. When both the bottle cover 14 and cover member 13 are assembled to the body member assembly 12, the latching finger 52 extends into the latching member recess 49 on the side of this recess not filled by the latching finger 48.

It should be readily apparent that the use of the side-by-side latching fingers 48 and 52 with the latching member recess 49 permits the bottle cover 14 and cover member 13 each to be secured to the body member assembly 12 by means of the single latching member 44. In addition, the bottle cover 14 is not necessary to secure the cover member 13 to the body assembly 12. Thus, the kit may be used without the bottle cover 14 and the cover member 13 will nevertheless be latched to the body assembly 12.

What is claimed is:

1. A lunch kit or the like comprising a body member defining a food receiving cavity opening through the upper end of said body member, a cover member adapted to be supported across the open end of said food receiving cavity of said body member and forming a closure therefor, a bottle cover defining a cavity therein opening through the lower face of said bottle cover, said bottle cover being adapted to be supported adjacent said cover member with said cover member forming a closure for the open end of said bottle cover cavity, and latching means for detachably connecting said cover member to said body member and said bottle cover to said body member comprising a first latching member carried by said body member, a second latching member carried by said cover member, said first latching member and said second latching member coacting to releasably restrain said cover member and said body member is assembled relationship, and a third latching member carried by said bottle cover, said third latching member and said first latching member coacting to releasably restrain said bottle cover and said body member in assembled relationship.

2. A lunch kit or the like as set forth in claim 1 wherein the first latching member is supported for movement between a latched position and an unlatched position, the second latching member being fixed to the cover member and the third latching member being fixed to the bottle cover.

3. A lunch kit or the like as set forth in claim 2 wherein the first latching member has a single latching member receiving recess in which the second latching member and third latching member are received when said first latching member is in its latched position and the body member, the cover member and the bottle cover are in their assembled relationship.

4. A lunch kit or the like as set forth in claim 3 wherein the second and third latching members are received in side-by-side relationship in the latching member receiving recess of the first latching member.

5. A lunch kit or the like as set forth in claim 1 wherein the first latching member comprises a generally U-shaped member defining an elongated latching member receiving opening, the lower ends of the legs of said U-shaped latching member being pivotally supported upon the body member for movement between a latched and an unlatched position, the second latching member being fixed to the cover member, the third latching member being fixed to the bottle cover, said second latching member and said third latching member being adapted to be received in said elongated recess of said U-shaped latching member.

6. A lunch kit or the like as set forth in claim 5 wherein the second and third latching members are received in side-by-side relationship in the elongated opening of the first latching member when the first latching member is in its latched position, said second and said third latching members being engaged with the web of said U-shaped latching member when received in said recess.

7. A lunch kit or the like as set forth in claim 1 wherein the cover member is supportingly engaged with the body member, the bottle cover being supportingly engaged with said cover member, latching means as defined in claim 1 being positioned at opposite ends of said lunch kit, each of said latching means comprising first, second and third latching members.

8. A lunch kit or the like as set forth in claim 7 wherein each of the first latching members is supported at least in part within an embossed section of the body member, there being a cooperating embossed section formed at each end of the cover member and from which the first latching member extends, the bottle cover having depending portions at each end thereof extending into the respective embossed portion of said cover member and from which the respective third latching member extends.

References Cited

UNITED STATES PATENTS

| 1,831,663 | 11/1931 | Hill | 206—4 |
| 2,150,536 | 3/1939 | Ziehm | 220—29 |
| 3,054,501 | 9/1962 | Maynard | 206—4 |
| 3,306,403 | 2/1967 | Heitler et al. | 190—49 |

WILLIAM T. DIXSON, Jr., *Primary Examiner.*

U.S. Cl. X.R.

220—29

PO-1050
(5/69)

UNITED STATES PATENT OFFICE
CERTIFICATE OF CORRECTION

Patent No. 3,426,889      Dated February 11, 1969

Inventor(s) George W. Fuller

It is certified that error appears in the above-identified patent and that said Letters Patent are hereby corrected as shown below:

Claim 8, line 5, change "first" to -- second --.

SIGNED AND
SEALED

NOV 18 1969

(SEAL)
Attest:

Edward M. Fletcher, Jr.
Attesting Officer

WILLIAM E. SCHUYLER, JR.
Commissioner of Patents